United States Patent
Jeong et al.

(10) Patent No.: US 9,787,114 B2
(45) Date of Patent: Oct. 10, 2017

(54) WIRELESS POWER TRANSMITTER AND WIRELESS POWER TRANSMISSION SYSTEM

(71) Applicant: Samsung Electro-Mechanics Co., Ltd, Suwon-si (KR)

(72) Inventors: In Wha Jeong, Suwon-si (KR); Jong Heum Park, Suwon-si (KR); Hugh Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 169 days.

(21) Appl. No.: 14/710,118

(22) Filed: May 12, 2015

(65) Prior Publication Data

US 2016/0013657 A1    Jan. 14, 2016

(30) Foreign Application Priority Data

Jul. 11, 2014  (KR) .................. 10-2014-0087772
Dec. 24, 2014  (KR) .................. 10-2014-0189110

(51) Int. Cl.

| | |
|---|---|
| H02J 5/00 | (2016.01) |
| H02J 7/02 | (2016.01) |
| H02J 7/00 | (2006.01) |
| H02J 50/40 | (2016.01) |
| H02J 50/12 | (2016.01) |
| H02J 50/80 | (2016.01) |

(52) U.S. Cl.
CPC ............ H02J 7/0044 (2013.01); H02J 50/12 (2016.02); H02J 50/40 (2016.02); H02J 50/80 (2016.02)

(58) Field of Classification Search
None
See application file for complete search history.

(56) References Cited

U.S. PATENT DOCUMENTS

| | | | |
|---|---|---|---|
| 2011/0285212 A1* | 11/2011 | Higuma | H02J 5/005 307/104 |
| 2014/0072320 A1* | 3/2014 | Ueno | G03G 15/2039 399/67 |
| 2015/0288217 A1* | 10/2015 | Mach | H02J 5/005 307/104 |

FOREIGN PATENT DOCUMENTS

| | | |
|---|---|---|
| CN | 1768462 A | 5/2006 |
| CN | 203631233 U | 6/2014 |
| JP | 2013085322 A | 5/2013 |
| KR | 1020130005571 A | 1/2013 |
| WO | WO 2004/073166 A2 | 8/2004 |

(Continued)

OTHER PUBLICATIONS

Chinese Office Action dated Apr. 19, 2017 in corresponding Chinese Patent Application No. 201510324235.0 (11 pages with English translation).

*Primary Examiner* — Jared Fureman
*Assistant Examiner* — Aqeel Bukhari
(74) *Attorney, Agent, or Firm* — NSIP Law

(57) ABSTRACT

A wireless power transmitter includes a standard resonator including a standard inductor and a standard capacitor connected to the standard inductor in parallel, one or more dedicated variable inductors connected to the standard resonator in series and having inductance varied in response to a control voltage respectively applied to the dedicated variable inductors, one or more dedicated resonance capacitors connected to the dedicated variable inductors in parallel, respectively, and a controlling unit outputting the control voltage.

19 Claims, 9 Drawing Sheets

(56) References Cited

FOREIGN PATENT DOCUMENTS

WO     WO 2013/102908 A1     7/2013

* cited by examiner

WIRELESS POWER TRANSMITTER AND WIRELESS POWER TRANSMISSION SYSTEM

CROSS-REFERENCE TO RELATED APPLICATIONS

This application claims the priority and benefit of Korean Patent Application Nos. 10-2014-0087772 filed on Jul. 11, 2014 and 10-2014-0189110 filed on Dec. 24, 2014, with the Korean Intellectual Property Office, the disclosures of which are incorporated herein by reference.

BACKGROUND

The present disclosure relates to a wireless power transmitter and a wireless power transmission system.

Wireless power transfer technology has been widely used in the chargers of various communications devices, including smartphones and several home appliances, and is a technology having a very wide range of applications, and may be used in the field of electric vehicles, or the like, in the future.

In wireless power transmission technology, a magnetic induction scheme and a magnetic resonance scheme have been developed. The magnetic induction scheme according to a wireless power consortium (WPC) standard uses a frequency of 110 kHz to 205 kHz, while the magnetic resonance scheme according to an alliance for wireless power (A4WP) standard uses a frequency of 6.78 MHz.

A scheme incorporating both the magnetic induction scheme and the magnetic resonance scheme has also been developed. For example, a technology allowing for long distance wireless charging using a magnetic resonance operation in a magnetic induction scheme using a frequency of 110 kHz to 205 kHz has been developed.

Meanwhile, power may be supplied to a plurality of wireless power receivers using a single wireless power transmitter. However, according to the related art, it is impossible to selectively charge only a portion of the plurality of wireless power receivers.

RELATED ART DOCUMENT

Korean Patent Laid-Open Publication No. 2013-0005571

SUMMARY

An aspect of the present disclosure may provide a wireless power transmitter capable of selectively charging only a portion of a plurality of wireless power receivers according to a user request or a user authentication.

An aspect of the present disclosure may also provide a wireless power transmission system capable of selectively charging only a portion of a plurality of wireless power receivers according to a user request or a user authentication.

According to an aspect of the present disclosure, a wireless power transmitter may include: a standard resonator including a standard inductor and a standard capacitor connected to the standard inductor in parallel, one or more dedicated variable inductors connected to the standard resonator in series and having inductance varied in response to a control voltage respectively applied to the dedicated variable inductors, one or more dedicated resonance capacitors connected to the dedicated variable inductors in parallel, respectively, and a controlling unit outputting the control voltage.

According to another aspect of the present disclosure, a wireless power transmission system may include: an external server transmitting information regarding whether or not a wireless power receiver is authenticated and information regarding a resonance frequency of the wireless power receiver when the wireless power receiver is connected to the external server, and a wireless power transmitter supporting the wireless power receiver so as to be connected to the external server and wirelessly transmitting power having the resonance frequency when the wireless power receiver is authenticated, wherein the wireless power transmitter includes a standard resonator including a standard inductor and a standard capacitor connected to the standard inductor in parallel, one or more dedicated variable inductors connected to the standard resonator in series and having inductance varied in response to a control voltage respectively applied to the dedicated variable inductors, one or more dedicated resonance capacitors connected to the dedicated variable inductors in parallel, respectively, and a controlling unit outputting the control voltage.

BRIEF DESCRIPTION OF DRAWINGS

The above and other aspects, features and other advantages of the present disclosure will be more clearly understood from the following detailed description taken in conjunction with the accompanying drawings, in which:

FIGS. 3 through 5 are diagrams illustrating an operation of a wireless power supply unit of the wireless power transmitter according to the present disclosure illustrated in FIG. 2, wherein FIG. 3 is a diagram illustrating an equivalent circuit diagram of the wireless power supply unit of the wireless power transmitter according to an exemplary embodiment in the present disclosure illustrated in FIG. 1 when power having a common resonance frequency is wirelessly transmitted, FIG. 4 is a diagram illustrating an equivalent circuit diagram of the wireless power supply unit of the wireless power transmitter according to an exemplary embodiment in the present disclosure illustrated in FIG. 1 when power having a first separate resonance frequency is wirelessly transmitted, and FIG. 5 is a diagram illustrating an equivalent circuit diagram of the wireless power supply unit of the wireless power transmitter according to an exemplary embodiment in the present disclosure illustrated in FIG. 1 when power having a second separate resonance frequency is wirelessly transmitted;

DETAILED DESCRIPTION

Figure 1:
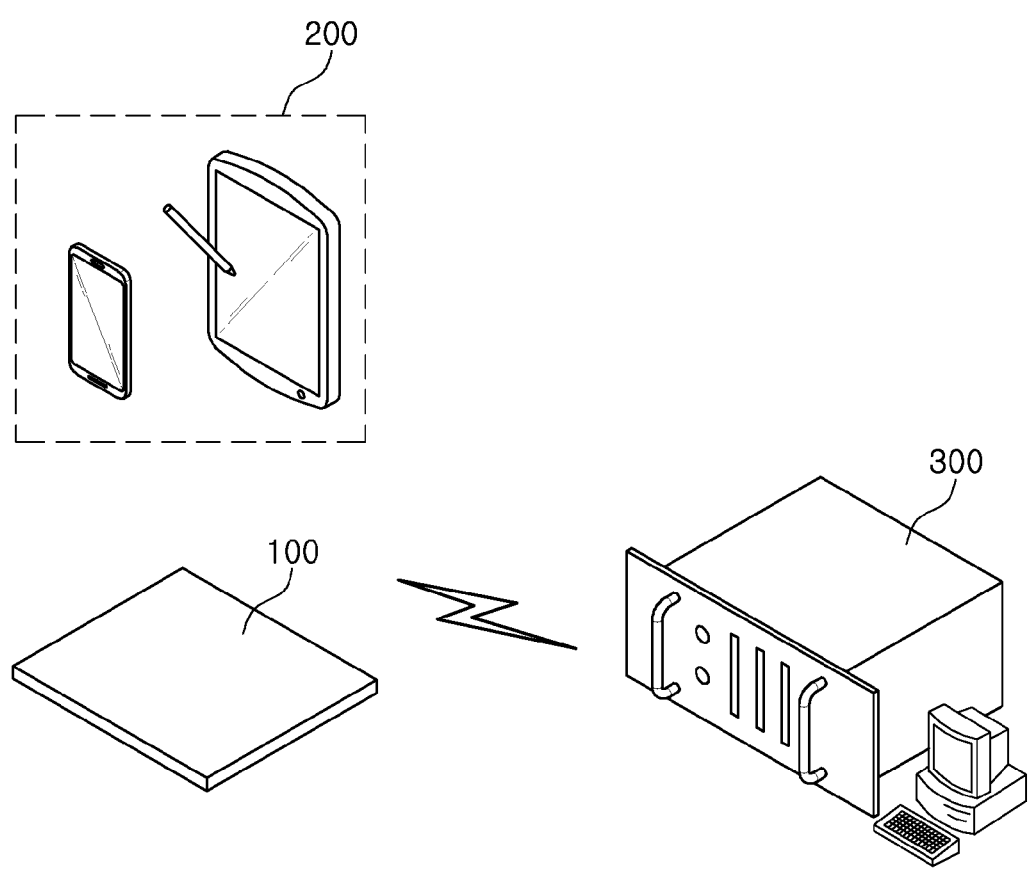
FIG. 1 is a diagram illustrating an example of a wireless power transmission system including a wireless power transmitter according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a diagram illustrating an example of a wireless power transmission system including a wireless power transmitter according to an exemplary embodiment in the present disclosure, wherein the wireless power transmission system may include a wireless power transmitter 100 and a wireless power receiver 200, and may further include an external server 300.

A function of each block illustrated in FIG. 1 will be described hereinafter.

The wireless power transmitter 100 wirelessly transmits power. The wireless power transmitter 100 may receive power from an external power source and may supply power wirelessly using the received power. In this case, the wireless power transmitter 100 may vary a resonance frequency of the power supplied wirelessly. For example, the wireless power transmitter 100 may wirelessly transmit power having various resonance frequencies and may dynamically change the resonance frequency of the power transmitted wirelessly.

The wireless power receiver 200 may wirelessly receive the power supplied by the wireless power transmitter 100. The wireless power receiver 200 may be various portable terminal devices such as a cellular phone, a smartphone, a tablet PC, and the like. The wireless power receiver 200 according to an exemplary embodiment in the present disclosure may include a receiving unit receiving power wirelessly, wherein the receiving unit may have one or a plurality of resonance frequencies. In the case in which the receiving unit has the plurality of resonance frequencies, at least one of the plurality of resonance frequencies may be the same standard resonance frequency as a resonance frequency of a receiving unit of another wireless power receiver.

In order for the wireless power receiver 200 to wirelessly receive power from the wireless power transmitter 100, the wireless power receiver 200 may go through a process such as a user authentication, or the like in advance. For example, the wireless power receiver 200 may be connected to the external server 300 through a Wi-Fi device embedded in the wireless power transmitter 100 and the external server 300 may transmit information regarding whether or not the wireless power receiver 200 has been authenticated and a resonance frequency of the authenticated wireless power receiver 200 to the wireless power transmitter 100, such that the user authentication process may be performed. The wireless power transmitter 100 may determine whether or not the wireless power receiver 200 has been authenticated through the method described above, and the wireless power transmitter 100 may only supply power wireless power receiver 200 in a case in which the wireless power receiver 200 has been authenticated, by wirelessly supplying the power at the resonance frequency of the authenticated wireless power receiver 200.

The user authentication process may be performed using various methods in addition to the method described above, and may also be performed without the external server 300. For example, in a case in which the wireless power transmitter 100 determines whether or not the wireless power receiver 200 is an authenticated device and the resonance frequency of the wireless power receiver 200, and it is determined that the wireless power receiver 200 is the authenticated device, the wireless power transmitter 100 may wirelessly supply power at the resonance frequency.

Figure 2:
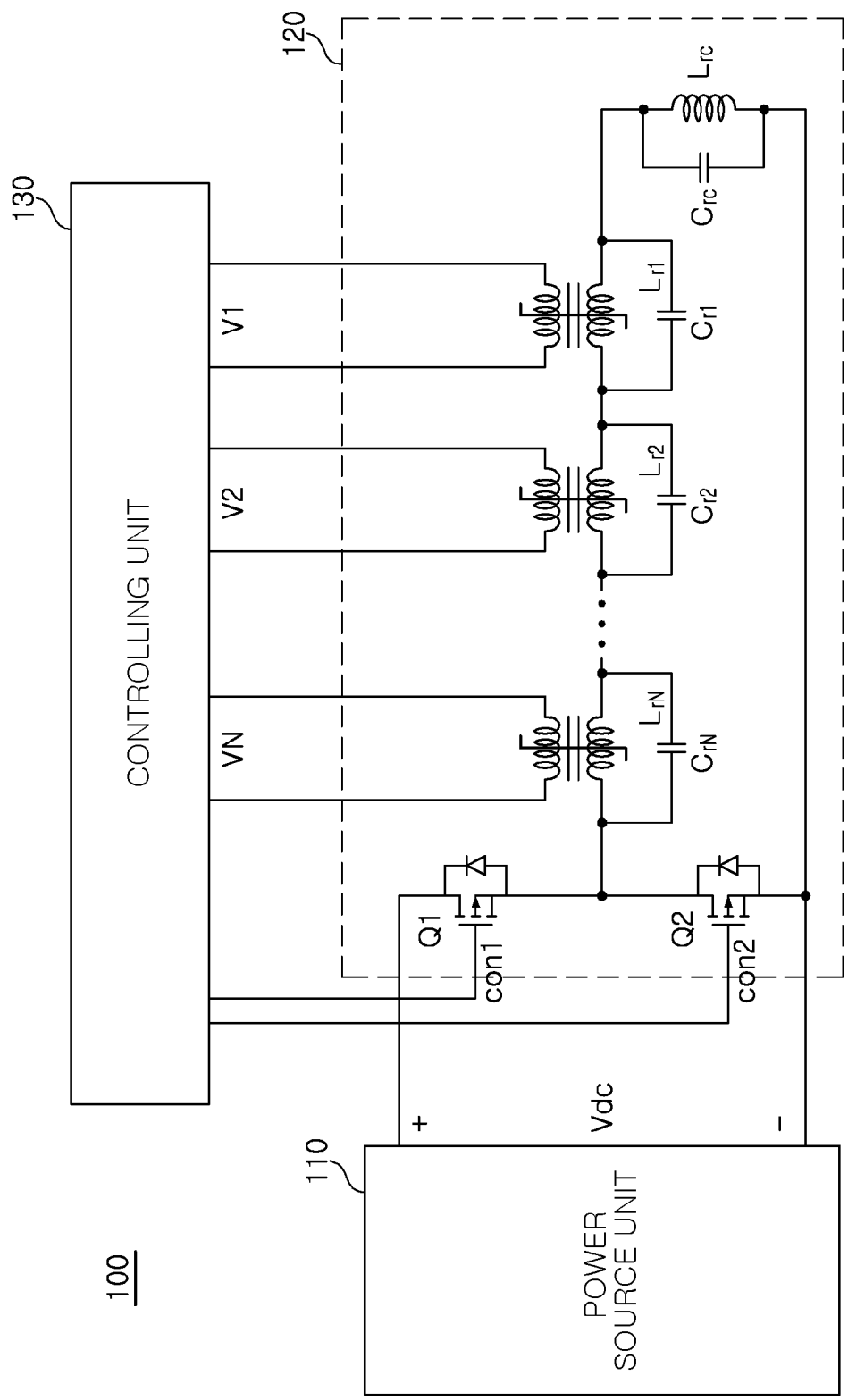
FIG. 2 is a diagram illustrating a configuration of the wireless power transmitter according to an exemplary embodiment in the present disclosure.

FIG. 2 is a diagram illustrating a configuration of the wireless power transmitter 100 according to an exemplary embodiment in the present disclosure, wherein the wireless power transmitter 100 may include a power source unit 110, a wireless power supply unit 120, and a controlling unit 130. The wireless power supply unit 120 may include a first switch Q1 and a second switch Q2 connected to each other in series between a terminal to which supply power is supplied by the power source unit 110 and a ground, a standard inductor or a transmitter coil $L_{rc}$ having one end connected to the ground, a standard capacitor $C_{rc}$ connected to the standard inductor $L_{rc}$ in parallel, a plurality of dedicated variable inductors $L_{r1}$, $L_{r2}$, . . . , $L_{rN}$ connected between a terminal to which the first switch Q1 and the second switch Q2 are connected and the other end of the standard inductor Lrc, and a plurality of dedicated capacitors $C_{r1}$, $C_{r2}$, . . . , $C_{rN}$ connected to each of the plurality of dedicated variable inductors $L_{r1}$, $L_{r2}$, . . . , $L_{rN}$ in parallel.

A function of each block illustrated in FIG. 2 will be described as follows.

The power source unit 110 may convert input power into supply power Vdc and output the supply power Vdc. The input power may be alternating current power, and the supply power Vdc may be direct current power. The power source unit 110 may be implemented in various forms.

The wireless power supply unit 120 may receive the supply power Vdc to wirelessly generate power.

The first switch Q1 and the second switch Q2 of the wireless power supply unit 120 may configure a half-bridge switch. The first switch Q1 and the second switch Q2 may complementarily perform a switching on and off operations in response to control signals con1 and con2 applied by the controlling unit 130.

Levels of inductance of each of the plurality of dedicated variable inductors $L_{r1}$, $L_{r2}$, . . . , $L_{rN}$ may be varied depending on each of control voltages V1, V2, . . . , VN applied from the controlling unit 130. Each of the plurality of dedicated variable inductors $L_{r1}$, $L_{r2}$, . . . , $L_{rN}$ may include a primary coil, and a secondary coil magnetically coupled to a primary coil applied with a corresponding control voltage among the control voltages V1, V2, . . . , VN. In this case, the primary coils of each of the plurality of dedicated variable inductors $L_{r1}$, $L_{r2}$, . . . , $L_{rN}$ may be connected to each other in series. The secondary coil may be a coil which is additionally wound in the primary coil. A detailed operation of the wireless power supply unit 120 will be described below with reference to FIGS. 3 through 5.

The controlling unit 130 may output the control signals con1 and con2 and the control voltages V1, V2, ..., VN. Specifically, the controlling unit 130 may determine a resonance frequency of power to be wirelessly transmitted and may output the control voltages V1, V2, ..., VN depending on the determined resonance frequency. In addition, the controlling unit 130 may output the control signals con1 and con2 so as to complementarily turn on or off the first switch Q1 and the second switch Q2 at a switching frequency linked to the resonance frequency of the power to be wirelessly transmitted, determined depending on the control voltages V1, V2, ..., VN.

Figure 3:
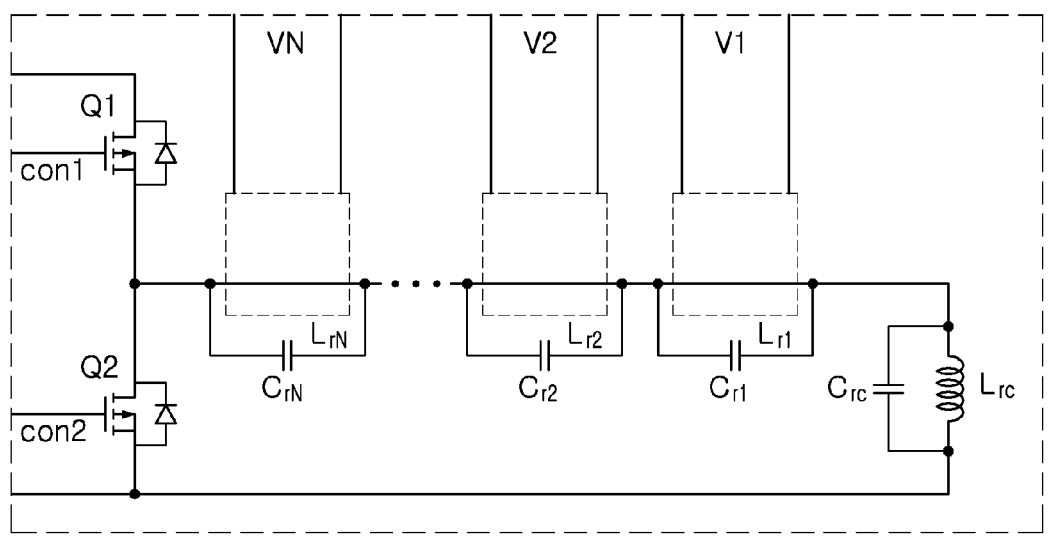
Figure 4:
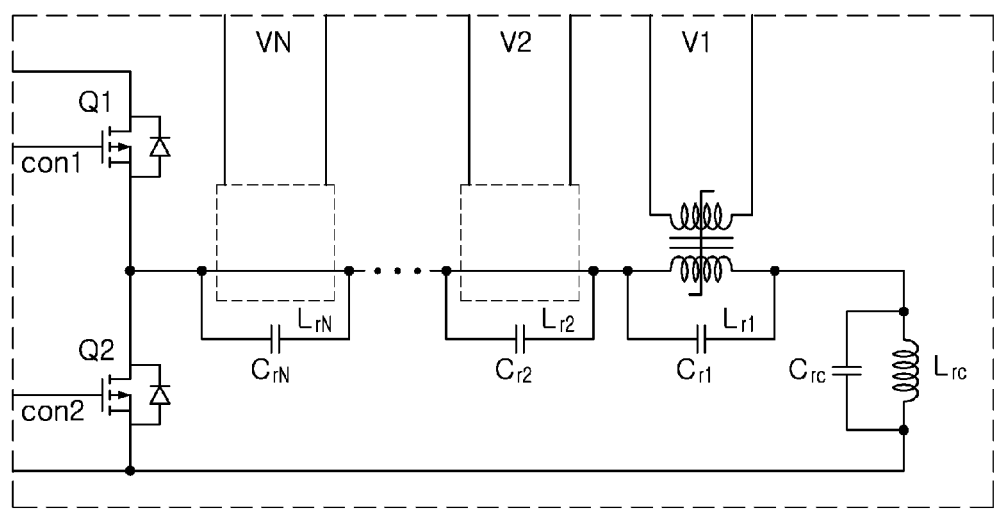
Figure 5:
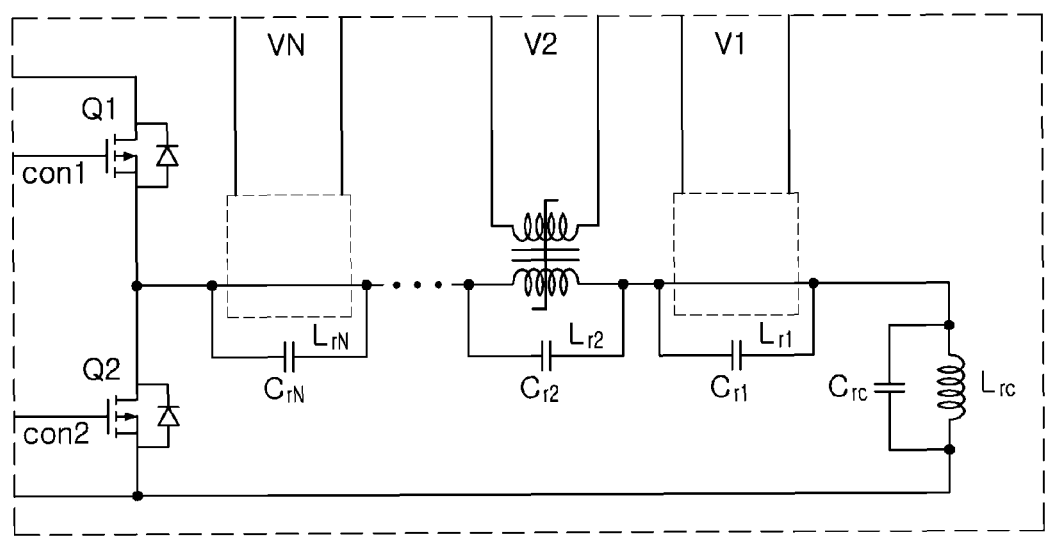

FIGS. 3 through 5 are diagrams illustrating an operation of a wireless power supply unit 120 of the wireless power transmitter 100 according to the present disclosure illustrated in FIG. 2.

First, FIG. 3 is a diagram illustrating an equivalent circuit diagram of the wireless power supply unit 120 of the wireless power transmitter 100 according to an exemplary embodiment in the present disclosure illustrated in FIG. 1 when power having a common resonance frequency is wirelessly transmitted.

When the power having the common resonance frequency is wirelessly transmitted, the controlling unit 130 may output the control voltages V1, V2, ..., VN so that levels of inductance of each of the plurality of dedicated variable inductors $L_{r1}, L_{r2}, \ldots, L_{rN}$ are reduced to zero. In this case, as illustrated in FIG. 3, the plurality of dedicated variable inductors $L_{r1}, L_{r2}, \ldots, L_{rN}$ and the plurality of dedicated capacitors $C_{r1}, C_{r2}, \ldots, C_{rN}$ all have no impact on the circuit and consequently, the resonance frequency may be determined by a standard inductor $L_{rc}$ and a standard capacitor $C_{rc}$. Therefore, by determining sizes of the standard inductor Lrc and the standard capacitor Crc so that the level of the resonance frequency reaches that of the common resonance frequency, the wireless power transmitter 100 may wirelessly transmit the power having the common resonance frequency.

FIG. 4 is a diagram illustrating an equivalent circuit diagram of the wireless power supply unit 120 of the wireless power transmitter 100 according to an exemplary embodiment in the present disclosure illustrated in FIG. 1 when power having a first separate resonance frequency is wirelessly transmitted.

When the power having the first separate resonance frequency is wirelessly transmitted, the controlling unit 130 may output the control voltages V1, V2, ..., VN so that a first dedicated variable inductor Lr1 has first inductance and levels of inductance of each of the remaining dedicated variable inductors $L_{r2}, \ldots, L_{rN}$ except for the first dedicated variable inductor $L_{r1}$ are reduced to zero. In this case, as illustrated in FIG. 4, the remaining dedicated variable inductors $L_{r2}, \ldots, L_{rN}$ except for the first dedicated variable inductor Lr1 and the remaining dedicated capacitors $C_{r2}, \ldots, C_{rN}$ except for a first dedicated capacitor $C_{r1}$ all have no impact on the circuit and consequently, the resonance frequency may be determined by the first dedicated variable inductor $L_{r1}$, the first dedicated capacitor $C_{r1}$, and the standard inductor $L_{rc}$ and the standard capacitor $C_{rc}$. Therefore, by determining sizes of the first dedicated variable inductor $L_{r1}$, the first dedicated capacitor $C_{r1}$, and the standard inductor $L_{rc}$ and the standard capacitor $C_{rc}$ so that the level of the resonance frequency reaches that of the first separate resonance frequency, the wireless power transmitter 100 may wirelessly transmit the power having the first separate resonance frequency.

FIG. 5 is a diagram illustrating an equivalent circuit diagram of the wireless power supply unit 120 of the wireless power transmitter 100 according to an exemplary embodiment in the present disclosure illustrated in FIG. 1 when power having a second separate resonance frequency is wirelessly transmitted.

When the power having the second separate resonance frequency is wirelessly transmitted, the controlling unit 130 may output the control voltages V1, V2, ..., VN so that a second dedicated variable inductor $L_{r2}$ has second inductance and levels of inductance of each of the remaining dedicated variable inductors $L_{r1}, \ldots, L_{rN}$ except for the second dedicated variable inductor $L_{r2}$ are reduced to zero. In this case, as illustrated in FIG. 5, the remaining dedicated variable inductors $L_{r1}, \ldots, L_{rN}$ except for the second dedicated variable inductor $L_{r2}$ and the remaining dedicated capacitors $C_{r1}, \ldots, C_{rN}$ except for a second dedicated capacitor $C_{r2}$ all have no impact on the circuit and consequently, the resonance frequency may be determined by the second dedicated variable inductor $L_{r2}$, the second dedicated capacitor $C_{r2}$, and the standard inductor $L_{rc}$ and the standard capacitor $C_{rc}$. Therefore, by determining sizes of the second dedicated variable inductor $L_{r2}$, the second dedicated capacitor $C_{r2}$, and the standard inductor $L_{rc}$ and the standard capacitor $C_{rc}$ so that the level of the resonance frequency reaches that of the second separate resonance frequency, the wireless power transmitter 100 may wirelessly transmit the power having the second separate resonance frequency.

Figure 6:
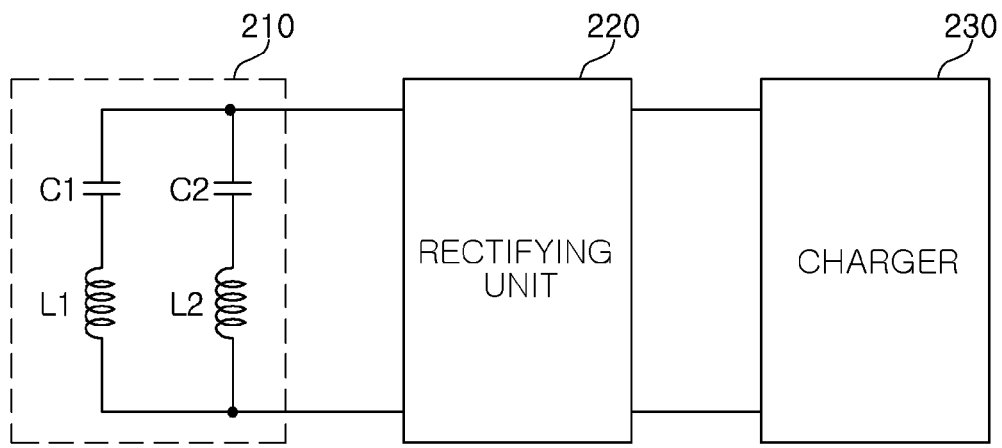
FIG. 6 is a diagram illustrating a configuration of a wireless power receiver according to an exemplary embodiment in the present disclosure.

FIG. 6 is a diagram illustrating a configuration of the wireless power receiver 200 according to an exemplary embodiment in the present disclosure, wherein the wireless power receiver 200 according to an exemplary embodiment in the present disclosure may include a receiving unit 210 and a rectifying unit 220, and may further include a charger 230.

A function of each block illustrated in FIG. 6 will be described as follows.

The receiving unit 210 may include two coils L1 and L2 and two capacitors C1 and C2, and may receive the power transmitted wirelessly from the wireless power transmitter 100. The number of coils and capacitors may be changed. The two coils L1 and L2 in the present exemplary embodiment may be connected to each of the two capacitors C1 and C2 in series, and each of the coils and capacitors (L1, C1) and (L2, C2) connected to each other in series may configure a resonance circuit. For example, the receiving unit 210 may have two different resonance frequencies $$\frac{1}{2\pi \cdot \sqrt{L1 \cdot C1}} = fr1 \text{ and } \frac{1}{2\pi \cdot \sqrt{L2 \cdot C2}} = frc.$$

One fr1 of the resonance frequencies may be the separate resonance frequency and the other frc may be the common resonance frequency. The separate resonance frequency means a unique frequency possessed by the wireless power receiver to be distinguished from another wireless power receiver, and the common resonance frequency means one frequency which is commonly possessed by a plurality of wireless power receivers.

The rectifying unit 220 may rectify the power which is wirelessly received by the receiving unit 210 and may convert the rectified power into direct current power. The rectifying unit 220 may step up or down a voltage of the direct current power in some cases.

The charger 230 may receive the direct current power from the rectifying unit 220 and may store energy.

Figure 7:
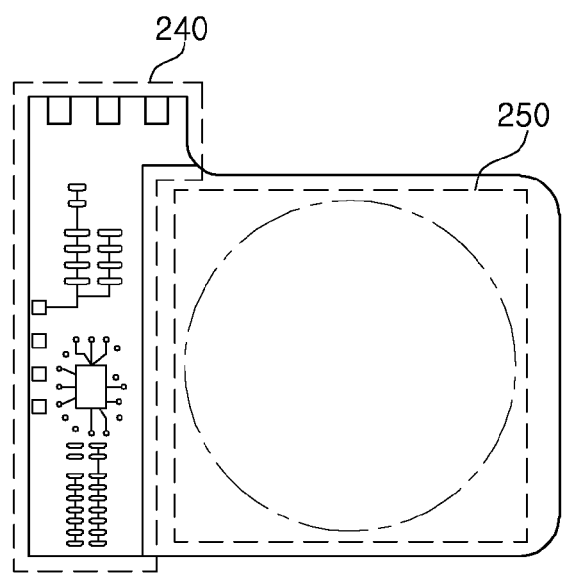
FIG. 7 is a diagram illustrating an example to which the wireless power receiver according to an exemplary embodiment in the present disclosure is actually applied.

FIG. 7 is a diagram illustrating an example to which the wireless power receiver 200 according to an exemplary embodiment in the present disclosure is actually applied, wherein the wireless power receiver 200 according to the present disclosure may include a printed circuit board (PCB) including a first region 240 on which a circuit, an electronic component, and the like are mounted, and a second region 250 on which a coil, and the like are mounted.

The rectifying unit 220 (see FIG. 6) of the wireless power receiver 200 (see FIG. 6) according to an exemplary embodiment in the present disclosure may be disposed in the first region 240. The rectifying unit 220 (see FIG. 6) may be implemented in a single chip form.

A first coil L1 and a second coil L2 of the receiving unit 210 (see FIG. 6) of the wireless power receiver 200 (see FIG. 6) according to an exemplary embodiment in the present disclosure may be formed in the second region 250.

A first capacitor C1 and a second capacitor C2 of the receiving unit 210 (see FIG. 6) of the wireless power receiver 200 (see FIG. 6) according to an exemplary embodiment in the present disclosure may also be disposed in the first region 240 and may also be formed in the second region 250. In the case in which the first capacitor C1 and the second capacitor C2 are formed in the second region 250, the first capacitor C1 and the second capacitor C2 may be formed in a form in which the first capacitor C1 and the second capacitor C2 are embedded in the printed circuit board.

Figure 8:
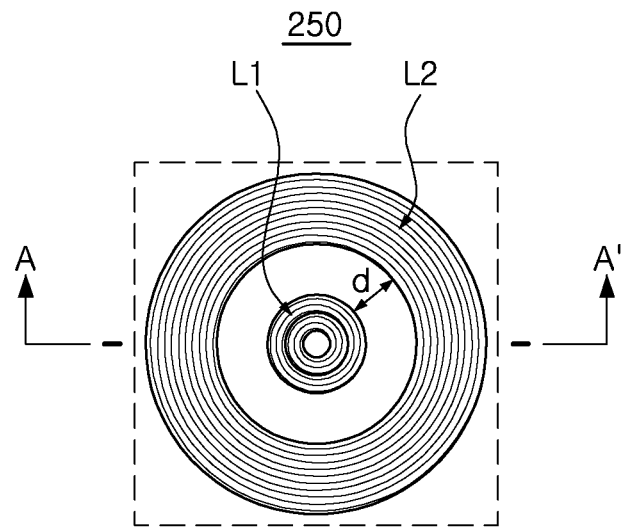
FIG. 8 is a diagram illustrating an example of a plane of a coil formed in a second region of the wireless power receiver according to an exemplary embodiment in the present disclosure.

FIG. 8 is a diagram illustrating an example of a plane of a coil formed in the second region of the wireless power receiver 200 according to an exemplary embodiment in the present disclosure.

As illustrated in FIG. 8, the first coil L1 may be disposed in an inner side while having an interval d spaced apart from the second coil L2 disposed on the same surface of the printed circuit board. Although the case in which the first coil L1 is disposed at an inner side of an internal diameter of the second coil L2 and the second coil L2 is disposed at an outer side of an external diameter of the first coil L1 has been illustrated in FIG. 8, the arrangement positions of the first coil L1 and the second coil L2 may be changed.

In addition, although not illustrated, the first coil L1 and the second coil L2 may also be disposed in parallel to each other, horizontally on the same surface of the PCB, and each of the first coil L1 and the second coil L2 may also be disposed on different layers of the printed circuit board, for example, one surface and the other surface of the printed circuit board.

In addition, although the case in which the first coil L1 and the second coil L2 have a circular shape has been illustrated in FIG. 8, the shape of the first coil L1 and the second coil L2 are not particularly limited.

Figure 9:
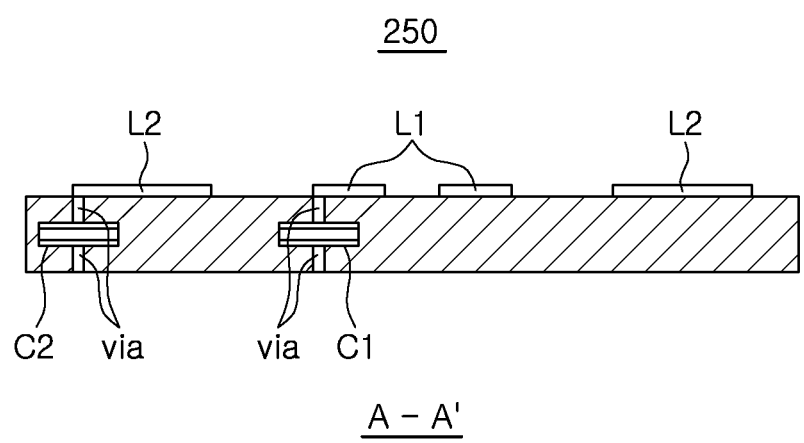
FIG. 9 is a diagram illustrating an example of a cross section of the second region of the wireless power receiver according to an exemplary embodiment in the present disclosure.

FIG. 9 is a diagram illustrating an example of a cross section of the second region of the wireless power receiver according to an exemplary embodiment in the present disclosure and illustrating an example of the capacitor formed in the second region 250 of the wireless power receiver 200.

As illustrated in FIG. 9, the first capacitor C1 and the second capacitor C2 may be disposed in the second region 250. In this case, the first capacitor C1 and the second capacitor C2 may be implemented in a form in which the first capacitor C1 and the second capacitor C2 are embedded in the PCB. The first capacitor C1 and the second capacitor C2 which are embedded may be each disposed between the first coil L1 and the rectifying unit 220 (see FIG. 6) and between the second coil L2 and the rectifying unit 220 (see FIG. 6) through via holes. As long as that the first capacitor C1 is connected to the first coil L1 in series and the second capacitor C2 is connected to the second coil L2 in series, the positions of the first capacitor C1 and the second capacitor C2 are not particularly limited.

In addition, the first capacitor C1 and the second capacitor C2 may also be disposed in the first region 240. In this case, the first capacitor C1 and the second capacitor C2 may be excluded from the second region 250.

Figure 10:
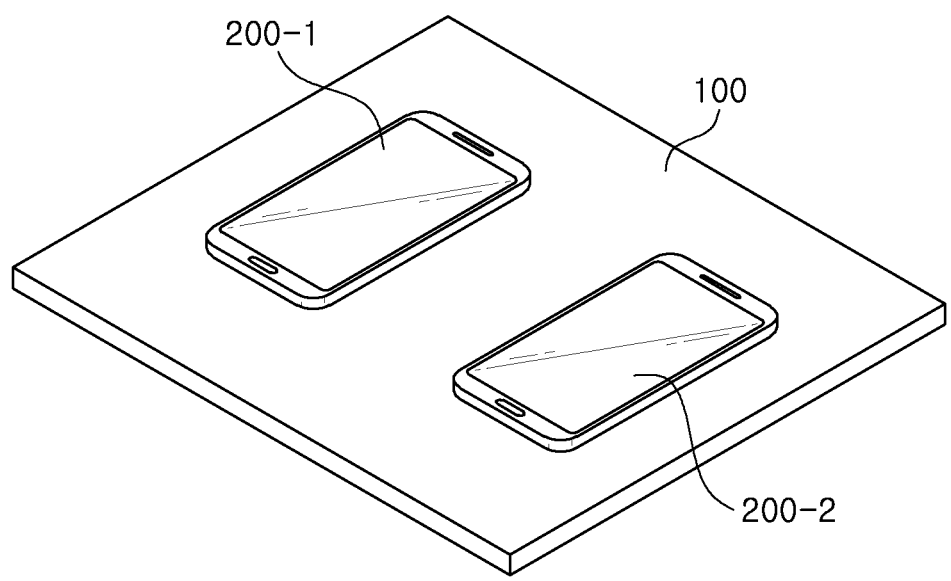
FIG. 10 is a diagram illustrating an operation of the wireless power transmitter according to an exemplary embodiment in the present disclosure and illustrating a case in which a plurality of wireless power receivers are disposed on the wireless power transmitter according to an exemplary embodiment in the present disclosure.

FIG. 10 is a diagram illustrating an operation of the wireless power transmitter 100 according to an exemplary embodiment in the present disclosure and illustrating a case in which a plurality of wireless power receivers 200-1 and 200-2 are disposed on the wireless power transmitter 100 according to an exemplary embodiment in the present disclosure.

Each of the plurality of wireless power receivers 200-1 and 200-2 may have the same configuration as that illustrated in FIG. 6. In this case, a first wireless power receiver 200-1 may include a receiving unit having the first separate resonance frequency fr1 and the common resonance frequency frc and a second wireless power receiver 200-2 may include a receiving unit having the second separate resonance frequency fr2 and the common resonance frequency frc.

The wireless power transmitter 100 may wireless supply power to a selected wireless power receiver among the plurality of wireless power receivers 200-1 and 200-2 or may supply power wirelessly to all of the plurality of wireless power receivers 200-1 and 200-2 in various methods.

For example, in a case in which only the first wireless power receiver 200-1 is authenticated and the second wireless power receiver 200-2 is not authenticated, the wireless power transmitter 100 may only wirelessly supply power to the first wireless power receiver 200-1 by wirelessly transmitting the power having the first separate resonance frequency fr1.

If only the second wireless power receiver 200-2 is authenticated and the first wireless power receiver 200-1 is not authenticated, the wireless power transmitter 100 may only wirelessly supply power to the second wireless power receiver 200-2 by wirelessly transmitting the power having the second separate resonance frequency fr2.

In a case in which both the first wireless power receiver 200-1 and the second wireless power receiver 200-2 are authenticated, the wireless power transmitter 100 may wirelessly supply power to both the first wireless power receiver 200-1 and the second wireless power receiver 200-2 by wirelessly transmitting the power having the common resonance frequency frc.

Alternatively, in a case in which both the first wireless power receiver 200-1 and the second wireless power receiver 200-2 are authenticated, the wireless power transmitter 100 may also wirelessly supply power to both the first wireless power receiver 200-1 and the second wireless power receiver 200-2 by wirelessly transmitting the power having the first separate resonance frequency fr1 and the power having the second separate resonance frequency fr2 in a time division scheme.

Figure 11A:
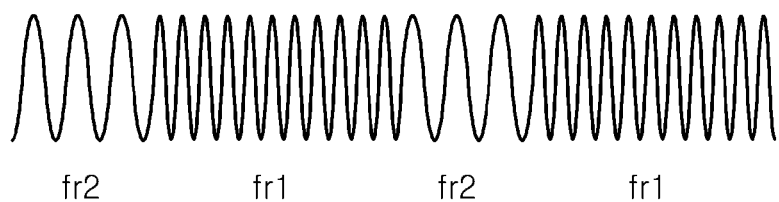
FIGS. 11A through 11C are diagrams illustrating a case in which the wireless power transmitter wirelessly transmits power in a time division scheme in FIG. 10.
Figure 11B:
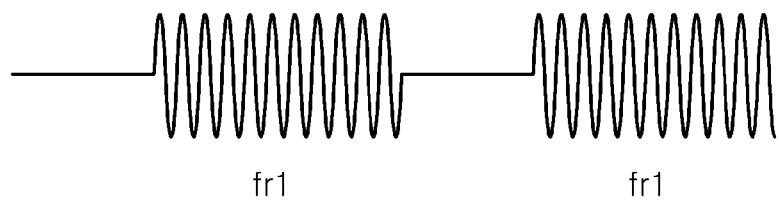
Figure 11C:
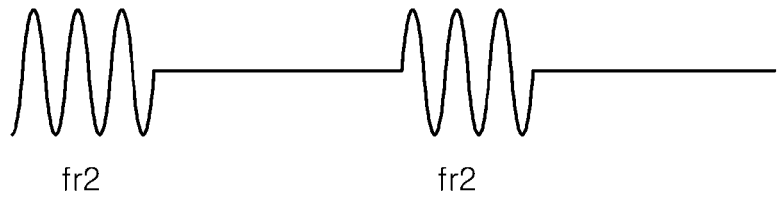

FIG. 11 is a diagram illustrating an operation of a case in which the power is wirelessly transmitted in the time division scheme in FIG. 10, wherein FIG. 11A illustrates a resonance frequency of the power which is wirelessly transmitted by the wireless power transmitter 100, FIG. 11B illustrates a resonance frequency of the power which is wirelessly received by the first wireless power receiver 200-1, and FIG. 11C illustrates a resonance frequency of the power which is wirelessly received by the second wireless power receiver 200-2.

In the case in which the power is wirelessly transmitted in the time division scheme, the wireless power transmitter 100 may wirelessly transmit the power having the first separate resonance frequency fr1 for a first period of time and may wirelessly transmit the power having the second separate resonance frequency fr2 for a second period of time. In this case, the first period of time and the second period of time may also be the same as each other and may also be different from each other as illustrated in FIG. 11.

For example, if the first wireless power receiver 200-1 has a priority higher than that of the second wireless power receiver 200-2, a time (first period of time) in which the power is wirelessly supplied to the first wireless power receiver 200-1 may be set to be longer than a time (second period of time) in which the power is wirelessly supplied to the second wireless power receiver 200-2. The priority of the wireless power receiver may be determined based on at least one of a charging degree of a battery of the wireless power receiver, a grade of a user of the wireless power receiver, and temperature of the wireless power receiver.

As set forth above, according to exemplary embodiments in the present disclosure, the wireless power transmitter and the wireless power transmission system may wirelessly transmit the power to only the a portion of the plurality of wireless power receivers by wirelessly transmitting the power having various resonance frequencies. In addition, the circuit and the control for changing the resonance frequency used for the wireless power transmission may be simplified and the resonance frequency may be dynamically changed in real time. In addition, the time-division charging to the plurality of wireless power receivers may be easily implemented.

In the above exemplary embodiments, "controlling unit" can be implemented in many ways, such as a processor, as program instructions for execution by a processor, as software modules, microcode, as computer program product on computer readable media, as logic circuits, as application specific integrated circuit, as firmware, etc. Further, embodiments of the invention can take the form of an entirely hardware embodiment, an entirely software embodiment or an embodiment containing both hardware and software elements.

While exemplary embodiments have been shown and described above, it will be apparent to those skilled in the art that modifications and variations could be made without departing from the scope of the present invention as defined by the appended claims.

What is claimed is:

1. A wireless power transmitter comprising:
a standard resonator including a standard inductor and a standard capacitor connected to the standard inductor in parallel;
one or more dedicated variable inductors connected to the standard resonator in series and having inductance varied in response to a control voltage respectively applied to the dedicated variable inductors;
one or more dedicated resonance capacitors connected to the dedicated variable inductors in parallel, respectively; and
a controlling unit outputting the control voltage.

2. The wireless power transmitter of claim 1, further comprising:
a power source unit converting input power into supply power and outputting the supply power; and
a first switch and a second switch connected to each other in series between a terminal to which the supply power is applied and a ground,
wherein the standard inductor and the dedicated variable inductors are connected between a terminal to which the first switch and the second switch are connected and the ground.

3. The wireless power transmitter of claim 2, wherein the controlling unit additionally outputs control signals controlling the first switch and the second switch, and the first switch and the second switch complementarily perform a switching on or off operation.

4. The wireless power transmitter of claim 1, wherein each of the dedicated variable inductors includes:
a primary coil; and
a secondary coil which is magnetically coupled to the primary coil and to which the control voltage is applied, and
the primary coils of the one or more dedicated variable inductors are connected to the standard inductor in series.

5. The wireless power transmitter of claim 1, wherein when the wireless power transmitter wirelessly transmits power having a common resonance frequency, the controlling unit outputs the control voltage so that levels of inductance of each of the dedicated variable inductors are reduced to zero.

6. The wireless power transmitter of claim 1, wherein when the wireless power transmitter wirelessly transmits power having a separate resonance frequency, the controlling unit outputs the control voltages so that inductances of the remaining dedicated variable inductors except for one dedicated variable inductor among the dedicated variable inductors become all zero.

7. The wireless power transmitter of claim 1, wherein the controlling unit outputs the control voltages according to a resonance frequency of a wireless power receiver which is authenticated.

8. The wireless power transmitter of claim 7, wherein when a first wireless power receiver having a first separate resonance frequency and a second wireless power receiver having a second separate resonance frequency are authenticated, the controlling unit outputs the control voltages so that power having the first separate resonance frequency is wirelessly transmitted for a first period of time and outputs the control voltages so that power having the second separate resonance frequency is wirelessly transmitted for a second period of time.

9. The wireless power transmitter of claim 8, wherein when the first wireless power receiver has a priority higher than a priority of the second wireless power receiver, the controlling unit sets the first period of time to be longer than the second period of time.

10. The wireless power transmitter of claim 9, wherein the controlling unit determines the priority based on at least one of a user grade, a charging degree of battery, and temperature of each of the first wireless power receiver and the second wireless power receiver.

11. A wireless power transmission system comprising:
an external server transmitting information regarding whether or not a wireless power receiver is authenticated and information regarding a resonance frequency of the wireless power receiver when the wireless power receiver is connected to the external server; and a wireless power transmitter supporting the wireless power receiver so as to be connected to the external server and wirelessly transmitting power having the resonance frequency when the wireless power receiver is authenticated, wherein the wireless power transmitter includes:

a standard resonator including a standard inductor and a standard capacitor connected to the standard inductor in parallel;

one or more dedicated variable inductors connected to the standard resonator in series and having inductance varied in response to a control voltage respectively applied to the dedicated variable inductors;

one or more dedicated resonance capacitors connected to the dedicated variable inductors in parallel, respectively; and a controlling unit outputting the control voltage.

12. The wireless power transmission system of claim 11, wherein the wireless power transmitter includes a Wi-Fi device and the wireless power receiver is connected to the external server through the Wi-Fi device.

13. The wireless power transmission system of claim 11, wherein each of the dedicated variable inductors includes:

a primary coil; and a secondary coil which is magnetically coupled to the primary coil and to which the control voltage is applied, and the primary coils of the dedicated variable inductors are connected to the standard inductor in series.

14. The wireless power transmission system of claim 11, wherein when the wireless power transmitter wirelessly transmits power having a common resonance frequency, the controlling unit outputs the control voltages so that levels of inductance of each of the dedicated variable inductors are reduced to zero.

15. The wireless power transmission system of claim 11, wherein when the wireless power transmitter wirelessly transmits power having a separate resonance frequency, the controlling unit outputs the control voltage so that inductances of the remaining dedicated variable inductors except for one dedicated variable inductor among the dedicated variable inductors become all zero.

16. The wireless power transmission system of claim 11, wherein the controlling unit outputs the control voltage according to a resonance frequency of a wireless power receiver which is authenticated.

17. The wireless power transmission system of claim 16, wherein when a first wireless power receiver having a first separate resonance frequency and a second wireless power receiver having a second separate resonance frequency are authenticated, the controlling unit outputs the control voltages so that power having the first separate resonance frequency is wirelessly transmitted for a first period of time and outputs the control voltages so that power having the second separate resonance frequency is wirelessly transmitted for a second period of time.

18. The wireless power transmission system of claim 17, wherein when the first wireless power receiver has a priority higher than a priority of the second wireless power receiver, the controlling unit sets the first period of time to be longer than the second period of time.

19. The wireless power transmission system of claim 18, wherein the external server determines the priority based on at least one of a user grade, a charging degree of battery, and temperature of each of the first wireless power receiver and the second wireless power receiver and transmits information regarding the determined priority to the wireless power transmitter.

* * * * *